Patented July 18, 1950

2,515,382

UNITED STATES PATENT OFFICE 2,515,382

PLASTIC COMPOSITIONS

Edmund H. Schwencke, New York, N. Y.

No Drawing. Application April 19, 1946,
Serial No. 663,639

2 Claims. (Cl. 260—33.6)

This invention relates to plastic compositions, and pertains particularly to a novel plasticizer for resins such as vinyl chloride, vinyl acetate, and for vinylidene resins such as vinylidene chloride or the copolymers of such vinyl and vinylidene resins.

Such vinyl and vinylidene resins, with or without fillers, pigments, etc., have been commonly plasticized by the use of ester type plasticizers such as phthalates, phosphates, sebacates and the like, with or without the use of solvents or non-solvent diluent or dispersing agents such as xylol, toluol and the like, and with or without the use of extenders.

Such plasticizers are expensive and add substantially to the cost of the finished plasticized product. Many hours of milling are required to produce a homogeneous product, and in the absence of solvents or diluents a thick, pasty product is obtained which must be subjected to heat and pressure in subsequent forming operations such as calendering, extruding or molding. By the use of diluents or diluents and solvents, a free flowing fluid product may be obtained, but in this case the diluent or diluent and solvent must be driven off by heat during subsequent applications. As a result, such a fluid product must be applied as a thin coating, or in cases where a thicker coating is required, a series of thin coatings must be applied and the diluent contained in each coating must be driven off before the next subsequent coating is applied. Such fluid products have not been used for molding operations because of the difficulty of driving off the diluent from a mass of any substantial thickness.

Furthermore, the amount of ester type plasticizer which may be combined with vinyl and vinylidene resins is limited. The maximum permissible without subsequent sweating out of the plasticizer is generally regarded to be in the neighborhood of one part of plasticizer to one part of resin, but for most purposes the permissible proportion of plasticizer is considerably less.

It is an object of the present invention to employ a plasticizer which is extremely cheap and which can be used in such high proportion to resin as to provide a free flowing, fluid product having all of the advantages and uses of the present fluid product prepared by the addition of diluents or diluents and solvents. But since I do not employ any diluent or solvent, my fluid product may be employed to form thick coatings in a single application, or it may be used directly in molding or casting operations to make plastic articles of substantial thickness or hollow articles having wall sections of substantial thickness.

For best results in the preparation of my composition I prefer to use a type of polymerized resin which has recently become available in the commercial market in dry powder form having an extremely small particle size averaging one half to one micron. While I may use either vinyl acetate or vinyl chloride or vinylidene chloride, I prefer to use a copolymer thereof. One such copolymer which I have found gives extremely good results is a copolymer containing approximately 95% polyvinyl chloride and 5% polyvinyl acetate having a molecular weight of approximately 13,000 and processed to produce the particle size above mentioned. Such material is commercially available under the trade names Plastisol and Organosol.

As a plasticizer for such resins I use a highly aromatic hydrocarbon oil, preferably 100% aromatic, but in any event not less than 90% aromatic, consisting predominantly of three and four ringed molecules containing two to four short alkyl side chains. Such aromatic hydrocarbon oils are now available commercially from the Socony-Vacuum Oil Company under the trade name Sovaloid C.

This plasticizer used in making the plastic composition of this invention has the following physical characteristics:

| | |
|---|---|
| Specific gravity, 60/60° F | 1.044–1.076 |
| Viscosity, Saybolt Universal @ 100° F sec. minimum | 110 |
| Mixed aniline point, °F. (critical solution temperature) | 65–75 |
| Boiling range, °F | 580–760 |

In the preparation of my plasticized composition I have found that I can use as much as two and one half parts of such plasticizer to one part resin, thereby producing a free flowing, fluid product having a consistency similar to that of ordinary oil paint and which may be poured. The exact proportions of plasticizer to resin may be varied, of course, depending on the use for which it may be intended. I may use as little as one half part of such plasticizer to one part resin, but in general the more important uses for the product make it advantageous to use from one and one half to two and one half parts plasticizer to one part resin, not only to obtain free flowing characteristics, but also to reduce the cost of the final product.

In compounding the product, I simply mix the dry powdered resin with the desired quantity of plasticizer, using any suitable form of mixing apparatus having a mechanical stirrer such as a propeller. After the ingredients are thoroughly mixed, the mixture is passed through a colloid mill or homogenizer which should be thoroughly cooled as even a small amount of heat generated in the mill will tend to cause the mixture to thicken and coagulate.

The product is ready for use after a single pass through the colloid mill or homogenizer, and now requires only heat treatment to produce a cured final product. No pressure is required and moderate heat is sufficient to cure the product. Temperatures as low as 85° C. or as high as 200° C. may be used although I prefer to use temperatures in the range between 125° and 175° C. for most purposes. The lower the temperature, the longer the time required for complete curing. However, the time required is short, it being necessary only to insure penetration of heat throughout the mass being cured. For example, I have cured a sheet having a thickness of ¼" in three minutes at a temperature of 125° C. None of the plasticizer is driven off during curing and substantially no shrinkage occurs.

The finished product is strong, tough and highly elastic. It is resistant to water, oils, acids, alkalies and many other materials. Particularly remarkable is its resistance to aromatic hydrocarbons and to mixed hydrocarbons such as kerosene which seriously affect vinyl resins which have been plasticized with ester type plasticizers.

I claim as my invention:

1. A plastic composition comprising one part of a resin selected from the group consisting of polymerized vinyl acetate, polymerized vinyl chloride, polymerized vinylidene chloride, and a copolymer of vinyl chloride and vinyl acetate, and one-half to two and one-half parts of hydrocarbon oil plasticizer, said hydrocarbon oil being at least 90% aromatic and characterized by the predominance of three and four ringed molecules containing two to four short alkyl side chains and having a specific gravity greater than one, a mixed aniline point critical solution temperature between 65–75° F., and having a boiling range between approximately 580–760° F.

2. A plastic composition in free flowing, fluid form comprising one part vinyl resin which is a copolymer formed of vinyl chloride and vinyl acetate having, in powder form, a particle size averaging from one-half to one micron and from one-half to two and one-half parts hydrocarbon oil plasticizer, said hydrocarbon oil being at least 90% aromatic and characterized by the predominance of three and four ringed molecules containing two to four short alkyl side chains and having a specific gravity greater than one, a mixed aniline point critical solution temperature between 65–75° F., and having a boiling range between approximately 580–760° F.

EDMUND H. SCHWENCKE.

REFERENCES CITED

The following references are of record in the file of this patent:

UNITED STATES PATENTS

| Number | Name | Date |
|---|---|---|
| 2,115,524 | Hochwalt et al. | Apr. 26, 1938 |
| 2,413,259 | Soday | Dec. 24, 1946 |